United States Patent [19]

Hardtke

[11] Patent Number: 4,928,911
[45] Date of Patent: May 29, 1990

[54] SUPPORTING BRACKET FOR PIPES

[75] Inventor: Hans H. Hardtke, Zeven, Fed. Rep. of Germany

[73] Assignee: Lisega GmbH, Fed. Rep. of Germany

[21] Appl. No.: 351,636

[22] Filed: May 15, 1989

[30] Foreign Application Priority Data

May 20, 1988 [DE] Fed. Rep. of Germany ... 8806646[U]

[51] Int. Cl.⁵ .............................................. F16L 3/08
[52] U.S. Cl. .................................. 248/74.1; 248/74.4; 248/230
[58] Field of Search .................. 248/74.1, 74.4, 74.5, 248/67.5, 67.7, 230

[56] References Cited

U.S. PATENT DOCUMENTS

| 1,341,113 | 5/1920 | Dottl et al. | 248/74.1 |
| 1,963,908 | 6/1934 | Manasek | 248/74.1 |
| 4,799,641 | 1/1989 | Koreski | 248/74.4 X |

FOREIGN PATENT DOCUMENTS

| 116748 | 6/1918 | United Kingdom | 248/74.1 |
| 722083 | 1/1955 | United Kingdom | 248/74.1 |
| 895934 | 5/1962 | United Kingdom | 248/74.4 |
| 963599 | 7/1964 | United Kingdom | 248/74.4 |

Primary Examiner—David L. Talbott
Attorney, Agent, or Firm—Diller, Ramik & Wight

[57] ABSTRACT

A pipe supporting bracket comprised of a pair of generally identical clip elements with each clip element being defined by a foot which is normal to a lower bar portion and a semicircular pipe gripping portion between the lower bar portion and an upper bar portion. The clips are placed in side-by-side relationship with the pipe gripping portions opening in opposed relationship to each other and gripping a pipe therebetween. The feet are directed opposite each other, and cooperative threaded bolts and nuts secure the upper and lower bar portions together to lend stability and security to the pipe supporting bracket.

15 Claims, 1 Drawing Sheet

SUPPORTING BRACKET FOR PIPES

BACKGROUND OF THE INVENTION

The invention relates to supporting means for pipes, particularly supporting brackets or clips for pipes of pipe systems used in power station applications in which heated fluid is conducted.

The supporting bracket of the invention includes a pair of interconnected clip elements of a generally mirror-like configuration having opposed pipe gripping portions which encompass and grip a pipe therebetween.

DESCRIPTION OF THE RELATED ART

Conventional supporting means of the type to which this invention is directed are known as "base pipe bearings," and these are particularly designed to support pipes of relatively small diameters, such as up to about 10 cm. These base pipe bearings include a bottom part composed of a base portion and a superposed tub-shape element. The base portion includes a T-shaped member and an upwardly directed bar on which the T-shaped element is disposed. These two elements are welded together at an end face of the upwardly directed bar. The tub-shaped element also includes a yoke having flanges which are connected by screws or the like to the tub-shaped element. The wall thickness of the T-member varies near the upwardly directed bar at the base portion, and both member are made from relatively heavy iron or similar material due to the necessity of utilizing welding at joints thereof. Materials of this type are very expensive and assembly thereof is also labor intensive. Furthermore, since the tub-shaped element is arranged in a substantially horizontal plane, dirt and/or condensation will accumulate in the tub-shaped element and deteriorate the same.

SUMMARY OF THE INVENTION

In keeping with the foregoing, it is a primary object of the present invention to provide supporting means of the foregoing type which is of a lightweight design and can be easily manufactured and assembled. The supporting means or pipe supporting bracket of the invention is characterized in that two bearing parts or pipe clip elements which receive and support an associated pipe are generally symmetrical in their constructions and are positioned generally symmetrically to a vertical plane. These clip elements are each also made of rolled sheet metal pieces which results in inexpensive material and labor. Each clip element includes a lower bar portion from which transversely projects a base portion or foot and above each lower bar portion is a semicircular central pipe gripping portion above which is an adjacent upper bar portion. Due to the latter design of the pipe supporting bracket of the invention, the same can be easily manufactured and assembled, particularly because of the symmetrical construction of the clip elements. Furthermore, as compared to conventional supporting means, the inventive pipe supporting bracket is of considerably lower weight while offering equal reinforcement and stability for an associated pipe, thus also permitting a substantial savings of material. The pipe supporting bracket is, therefore, quite light in weight which complies with all requirements of conventional heavy designs, but, of course, without the added weight. Furthermore, condensation is prevented from accumulating and detoriating the clip elements of the inventive pipe supporting bracket because condensation can not accumulate in the pipe gripping portion thereof.

In further accordance with the invention the pipe clips are preferably so arranged with respect to each other that the lower bar portions thereof are contiguous or in contact at a vertical plane passing through the generatrix centers of the semicircular pipe gripping portions. Stated another way, upon the assembly of the pipe supporting bracket, a pipe is encompassed between opposing pipe gripping portions, and a plane through the axis of the pipe in the center of the pipe gripping portions passes through the abutment plane of the lower bar portions. This insures the stability of the lower bar portions which is augmented by threaded nuts and bolts clamping the same in intimate contact. The upper bar portions are spaced from each other and from the vertical plane latter-noted, and this insures that when the upper bar portions are clamped by an associated threaded bolt and nut, the pipe held between the pipe gripping portions is tightly clamped therebetween.

With the above and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENT

Figure 1:
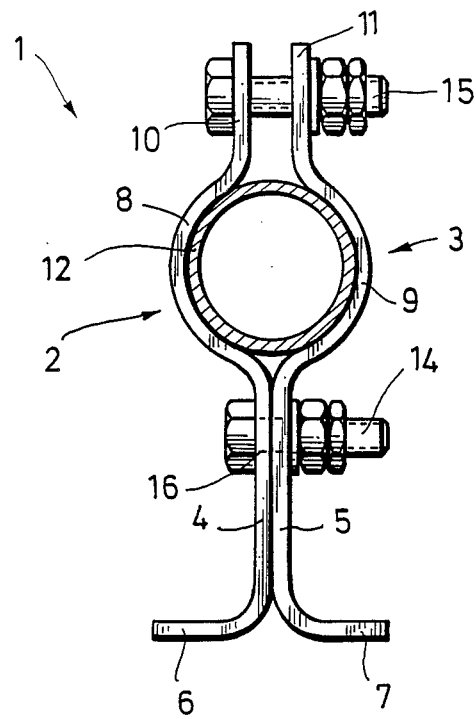
FIG. 1 is a side elevational view of the novel pipe supporting bracket of the present invention, and illustrates two generally similar pipe clips thereof in assembled relationship relative to an associated pipe shown in phantom outline.

A novel pipe supporting bracket or clip of the present invention is generally designated by the reference numeral 1 and is preferably used for supporting pipes having relatively small diameters, such as about 10 to 12 cm. The pipe supporting bracket is composed of two generally identical pipe clip elements 2, 3 made by conventional rolling techniques from sheet metal, and when assembled two of the pipe clip elements 2, 3 generally occupy a vertical position (FIG. 1) in intimate face-to-face relationship to each other. Each of the pipe clip elements 2, 3 includes a lower bar portion 4, 5, a base portion or foot 6, 7, respectively, disposed generally normal to the respective lower base portion 4, 5, a semicircular central pipe gripping portion 8, 9 and upwardly extending upper bar portions 10, 11. All of the four portions 4, 6, 8 and 10 of the pipe clip element 2 and 5, 7, 9 and 11 of the pipe clip element 3 are formed by the rolling techniques heretofore noted, particularly in the formation of the respective central pipe gripping portions 8, 9 thereof.

When in the assembled position (FIG. 1) with a pipe 12 gripped between the pipe gripping portions 8, 9, the pipe clip elements 2, 3 are generally disposed upright or vertically. Furthermore, a vertical plane which passes through the axis of the pipe 12 and the generatrix center of the semicircular pipe gripping portions 8, 9 also passes through the abutment plane at which the opposing surfaces (unnumbered) of the lower bar portions 4, 5 contact each other. The latter arrangement affords maximum stability to the supporting bracket 1 when the pipe is being supported thereby. The upper bar portions, 10, 11 are not in contiguous or abutting relationship to each other but are instead spaced a predetermined distance from each other and from the vertical plane passing through the pipe axis and the generatrix center of the semicircular pipe gripping portions 8, 9. This spacing allows the upper bar portions 10, 11 to be drawn toward each other to effectively clamp the pipe 12 therebetween. Upon tightening of cooperatively threaded bolts and nuts which are collectively designated by the reference numerals 15. The bolt passes through an opening 17 (FIG. 2) and is secured by the nuts and counternuts as in clearly apparent from FIG. 1.

Figure 2:
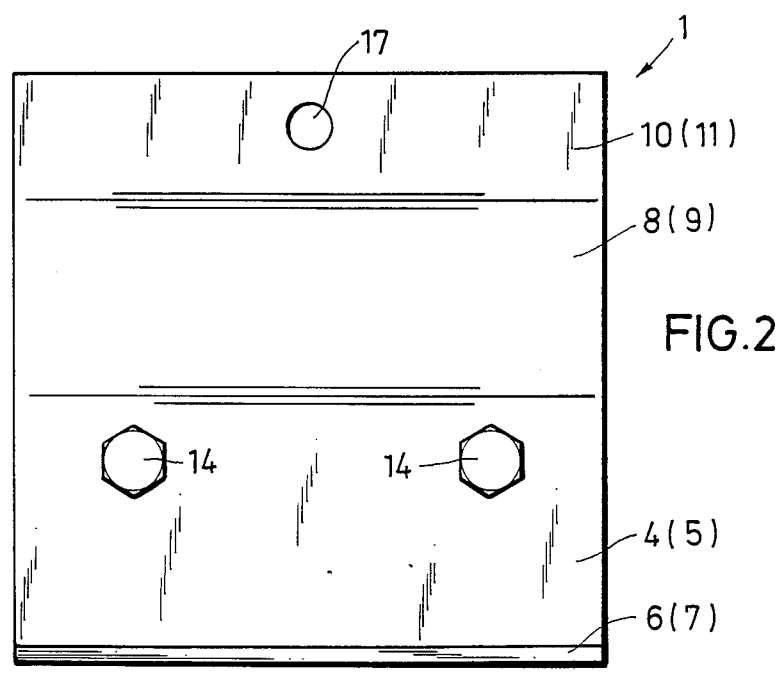
FIG. 2 is a side view of one of the two sheet metal clip elements forming the pipe supporting bracket of the invention, and illustrates the constructional details of the pipe clip element including a pair of bolts passing through a lower bar portion and an opening in an upper bar portion thereof.

The lower bar portions 4, 5 are similarly maintained in abutting relationship by cooperative threaded bolts and nuts 14 which pass through a pair of bores 16, as is apparent from FIGS. 1 and 2 of the drawings. The use of two nuts and bolts 16 prevents canting or caulking of the pipe elements 2, 3 relative to each other.

Although a preferred embodiment of the invention has been specifically illustrated and described herein, it is to be understood that minor variations may be made in the apparatus without departing from the spirit and scope of the invention, as defined in the appended claims.

I claim:

1. A pipe support bracket comprising a pair of clip elements, each clip element including a foot disposed generally transverse to a lower bar portion which is in turn joined to an upper bar portion by an intervening semicircular pipe gripping portion, said clip elements being positioned with said semicircular pipe gripping portions opening in opposed relationship to each other whereby a pipe can be housed therebetween, said feet projecting in opposite directions away from each other, said lower bar portions being disposed generally intimately adjacent each other and contiguous a plane passing through a center defining the generatrix of said semicircular pipe gripping portions, said upper bar portions being disposed in spaced relationship from each other and from said plane passing through said center, the spacing between said upper bar portions being greater than that between said lower bar portions, a first opening in each of said upper bar portions, said first openings being generally aligned, a pair of second openings in each of said lower bar portions, said second openings of said lower bar portions being generally aligned, said second openings of each pair of openings of said lower bar portions being located on opposite sides of a second plane normal to said first-mentioned plane and passing through centers of said first openings, and means for securing said upper and lower bar portions to each other through said associated openings.

2. The pipe supporting bracket as defined in claim 1 wherein said securing means are threaded bolts passing through said openings and associated nuts secured thereto.

3. The pipe supporting bracket as defined in claim 2 wherein each foot is disposed generally normal to its associated lower bar portion.

4. The pipe supporting bracket as defined in claim 2 wherein each of said clip elements is formed of rolled sheet metal.

5. The pipe supporting bracket as defined in claim 2 wherein said upper bar portions are in generally parallel relationship to each other.

6. The pipe supporting bracket as defined in claim 2 wherein said upper bar portions are in generally parallel relationship to each other, and said lower bar portions are in generally parallel relationship to each other.

7. The pipe supporting bracket as defined in claim 2 wherein said lower bar portions are in generally parallel relationship to each other.

8. The pipe supporting bracket as defined in claim 7 wherein each of said clip elements is formed of rolled sheet metal.

9. The pipe supporting bracket as defined in claim 8 wherein said upper bar portions are in generally parallel relationship to each other.

10. The pipe supporting bracket as defined in claim 7 wherein said upper bar portions are in generally parallel relationship to each other.

11. The pipe supporting bracket as defined in claim 1 wherein each foot is disposed generally normal to its associated lower bar portion.

12. The pipe supporting bracket as defined in claim 1 wherein each of said clip elements is formed of rolled sheet metal.

13. The pipe supporting bracket as defined in claim 1 wherein said upper bar portions are in generally parallel relationship to each other.

14. The pipe supporting bracket as defined in claim 1 wherein said lower bar portions are in generally parallel relationship to each other.

15. The pipe supporting bracket as defined in claim 1 wherein said upper bar portions are in generally parallel relationship to each other, and said lower bar portions are in generally parallel relationship to each other.

* * * * *